US009785276B2

(12) United States Patent
Wei et al.

(10) Patent No.: US 9,785,276 B2
(45) Date of Patent: *Oct. 10, 2017

(54) CAPACITIVE IN-CELL TOUCH PANEL AND DISPLAY DEVICE

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Xiangdong Wei, Beijing (CN); Fuqiang Li, Beijing (CN); Cheng Li, Beijing (CN); Xeuguang Hao, Beijing (CN); Xuelu Wang, Beijing (CN); Seongjun An, Beijing (CN); Bongyeol Ryu, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,568

(22) PCT Filed: May 29, 2014

(86) PCT No.: PCT/CN2014/000542
§ 371 (c)(1),
(2) Date: Nov. 28, 2014

(87) PCT Pub. No.: WO2015/039403
PCT Pub. Date: Mar. 26, 2015

(65) Prior Publication Data
US 2015/0317023 A1    Nov. 5, 2015

(30) Foreign Application Priority Data
Sep. 23, 2013 (CN) .......................... 2013 1 0436208

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/011* (2013.01); *G06F 3/044* (2013.01); *G06F 3/0412* (2013.01);
(Continued)

(58) Field of Classification Search
CPC ...... G06F 3/044; G06F 3/0412; G06F 3/0416; G06F 3/011; G06F 2203/04808;
(Continued)

(56) References Cited

U.S. PATENT DOCUMENTS 9,201,535 B2 * 12/2015 Wang .................... G06F 3/0412
9,360,979 B2 *  6/2016 Liu ......................... G06F 3/044
(Continued)

FOREIGN PATENT DOCUMENTS

CN   102341774   2/2012
CN   102890379   1/2013
(Continued)

OTHER PUBLICATIONS

International Search Report and Written Opinion from PCT/CN2014/000542 dated Aug. 19, 2014.
(Continued)

*Primary Examiner* — Vijay Shankar
(74) *Attorney, Agent, or Firm* — Calfee, Halter & Griswold LLP

(57) ABSTRACT

The invention discloses a capacitive in-cell touch panel and a display device. Since at least two neighboring gate lines on a common array substrate and the gates connected with them serve as a first touch sensing electrode, at least two neighboring data lines on the common array substrate and the
(Continued)

sources connected with them serve as a second touch sensing electrode, and there is no need to further add a new film layer on the existing array substrate, this may reduce the number of masking in the production process, decrease the thickness of the touch panel and lower the production cost; moreover, a time divisional driving mode is adopted in the touch-control time period and the display time period, which may avoid the interference between the display signal and the touch-control driving signal, and guarantee the quality of a display picture and the accuracy of the touch-control.

10 Claims, 4 Drawing Sheets

(51) Int. Cl.
*G06F 3/01* (2006.01)
*G06F 3/044* (2006.01)

(52) U.S. Cl.
CPC .............. *G06F 2203/04101* (2013.01); *G06F 2203/04104* (2013.01); *G06F 2203/04111* (2013.01); *G06F 2203/04112* (2013.01); *G06F 2203/04808* (2013.01)

(58) Field of Classification Search
CPC . G06F 2203/04104; G06F 2203/04111; G06F 2203/04112; G06F 2203/04101
USPC .................... 345/173–179; 178/18.01–18.09, 178/20.01–20.04
See application file for complete search history.

(56) References Cited

U.S. PATENT DOCUMENTS

| | | | | |
|---|---|---|---|---|
| 2014/0118299 A1* | 5/2014 | Wang | .................... | G06F 3/0416 345/174 |
| 2014/0168154 A1* | 6/2014 | Wang | .................... | G06F 3/0412 345/174 |

FOREIGN PATENT DOCUMENTS

| | | |
|---|---|---|
| CN | 103197796 | 7/2013 |
| CN | 203084701 | 7/2013 |
| CN | 103268178 | 8/2013 |
| CN | 103294312 | 9/2013 |
| CN | 103472966 | 12/2013 |
| CN | 203480490 | 3/2014 |
| KR | 101295537 | 8/2013 |

OTHER PUBLICATIONS

Translation of International Search Report and Written Opinion from PCT/CN2014/000542 dated Aug. 19, 2014.
Office action from Chinese Application No. 201310436208.3 dated May 17, 2016.
Office action from Chinese Application No. 201310436208.3 dated Dec. 2, 2015.
Office Action from China Application No. 201310436208.3 dated Nov. 30, 2016.
Office action from Chinese Application No. 201310436208.3 dated Sep. 13, 2016.

* cited by examiner

CAPACITIVE IN-CELL TOUCH PANEL AND DISPLAY DEVICE

CROSS REFERENCE TO RELATED APPLICATIONS

The present application is the U.S. national phase entry of PCT/CN2014/000542, with an international filing date of May 29, 2014, which claims the benefit of Chinese Patent Application No. 201310436208.3, filed Sep. 23, 2013, the entire disclosure of which is incorporated herein by reference.

FIELD OF THE INVENTION

The invention relates to the filed of display technology, and in particular, to a capacitive in-cell touch panel and a display device.

BACKGROUND OF THE INVENTION

According to their constitution and structure, touch panels may be divided into: an add-on mode touch panel, an on-cell touch panel, or an in-cell touch panel. Therein, for an in-cell touch panel, the touch-control electrodes of the touch panel are disposed inside the liquid crystal display panel, which may thin the thickness of the module as a whole, and also greatly reduce the production cost of the touch panel. According to its working principle, a touch panel may be divided into: a resistive touch panel and a capacitive touch panel, etc. Therein, the capacitive touch panel supports a multi-touch function, has a relatively high light transmittance and a relatively low overall power consumption, the hardness of its contact surface is high, and its useful life is relatively long.

At present, an existing capacitive in-cell touch panel is realized by directly further adding touch-control scanning lines and touch-control sensing lines on an existing array substrate, namely, two layers of strip electrodes intersecting each other at different planes are produced on the surfaces of the array substrate, the two layers of electrodes are taken as touch-control driving lines and touch-control sensing lines of the touch panel, and a mutual capacitor is formed where two electrodes intersect at different planes. Its working procedure is as follows: when loading a touch-control driving signal to the electrodes as the touch-control driving lines, a voltage signal is detected which is coupled out via the mutual capacitor by the touch-control sensing lines; in such a procedure, when a human body contacts the touch panel, the electric field of the human body will act on the mutual capacitor, so as to cause the capacitance of the mutual capacitor to vary, and in turn change the voltage signal coupled out by the touch-control sensing lines; and the contact position may be determined according to the variation of the voltage signal.

In the structural design of the above capacitive in-cell touch panel, since it is needed to newly add touch-control scanning lines and touch-control sensing lines on an existing array substrate, this will increase the number of masking in the production process, increase the thickness of the touch panel, thereby increasing the production cost; moreover, the touch-control driving signal loaded on the newly added touch-control scanning lines will interfere with the original display signal, affecting the quality of a display picture and the accuracy of the touch-control.

Therefore, a technical problem needing to be solved by the person skilled in the art is how to reduce the number of masking in the production process, decrease the thickness of the touch panel, and avoid the interference between the touch-control driving signal and the display signal.

SUMMARY OF THE INVENTION

In view of this, embodiments of the invention provide a capacitive in-cell touch panel and a display device so as to reduce the number of masking in the production process, decrease the thickness of the touch panel, and avoid the interference between the display signal and the touch-control driving signal.

Therefore, an embodiment of the invention provides a capacitive in-cell touch panel comprising an array substrate having data lines, gate lines and thin film transistors; a gate of the thin film transistor is connected with one of the gate lines, and a source of the transistor is connected with one of the data lines;

at least two neighboring gate lines and the gates connected with the gate lines constitute a first touch sensing electrode;

at least two neighboring data lines and the sources connected with the data lines constitute a second touch sensing electrode;

in a touch-control time period, a touch-control driving signal is loaded to the individual first touch sensing electrodes, the second touch sensing electrodes are coupled with a voltage signal of the touch-control driving signal and then output; or, a touch-control driving signal is loaded to the individual second touch sensing electrodes, the first touch sensing electrodes are coupled with a voltage signal of the touch-control driving signal and then output.

In the above touch panel provided by the embodiment of the invention, since at least two neighboring gate lines on a common array substrate and the gates connected with them serve as a first touch sensing electrode, at least two neighboring data lines on the common array substrate and the sources connected with them serve as a second touch sensing electrode, and there is no need to further add a new film layer on the existing array substrate, this may reduce the number of masking in the production process, decrease the thickness of the touch panel and lower the production cost; at the same time, multiple neighboring gate lines and the gates connected with them jointly serve as a first touch sensing electrode, multiple neighboring data lines and the sources connected with them jointly serve as a second touch sensing electrode, and this may increase the touch-control sensitivity of the touch panel; and moreover, a time divisional driving mode is adopted in the touch-control time period and the display time period, which may avoid the interference between the display signal and the touch-control driving signal, and guarantee the quality of a display picture and the accuracy of the touch-control.

Preferably, to guarantee the consistency of the touch-control precision of the touch panel, the number of the gate lines comprised in the individual first touch sensing electrodes is identical; and the number of the data lines comprised in the individual second touch sensing electrodes is identical.

Further, the number of the gate lines comprised in the individual first touch sensing electrodes is the same as the number of the data lines comprised in the individual second touch sensing electrodes.

Further, to avoid producing a signal interference between the individual first touch sensing electrodes, at least one gate line between the individual first touch sensing electrodes and the gates connected with the at least one gate line constitute a first floating electrode; and/or, to avoid producing a signal interference between the individual second touch sensing electrodes, at least one data line between the individual second touch sensing electrodes and the sources connected with the at least one data line constitute a second floating electrode.

Preferably, to guarantee the consistency of the touch-control precision of the touch panel, the number of the gate lines comprised in the individual first floating electrodes is identical; and the number of the data lines comprised in the individual second floating electrodes is identical.

Further, the number of the gate lines comprised in the individual first floating electrodes is the same as the number of the data lines comprised in the individual second floating electrodes.

Further, the above touch panel provided by an embodiment of the invention further comprises: first touch-control switches in one-to-one correspondence with the first touch sensing electrodes, second touch-control switches in one-to-one correspondence with the second touch sensing electrodes, and a touch-control driving circuit; wherein the first touch sensing electrodes are electrically connected with the touch-control driving circuit via respective first touch-control switches, and the second touch sensing electrodes are electrically connected with the touch-control driving circuit via respective second touch-control switches; and in the touch-control time period, the touch-control driving circuit controls the first touch-control switches and the second touch-control switches to be in an ON state, respectively, such that the touch-control driving circuit is in a conducting state with the first touch sensing electrodes and the second touch sensing electrodes, respectively.

In particular, the first touch-control switches and the second touch-control switches are located inside the touch-control driving circuit; or, the first touch-control switches are located where the first touch sensing electrodes are connected with the touch-control driving circuit, and the second touch-control switches are located where the second touch sensing electrodes are connected with the touch-control driving circuit.

Preferably, the touch-control driving circuit is located inside a display driving circuit in the touch panel.

An embodiment of the invention further provides a display device comprising the above capacitive in-cell touch panel provided by an embodiment of the invention.

DETAILED DESCRIPTION OF THE INVENTION

In the following the particular implementations of a capacitive in-cell touch panel and a display device provided by embodiments of the invention will be described in detail in connection with the drawings.

Figure 1:
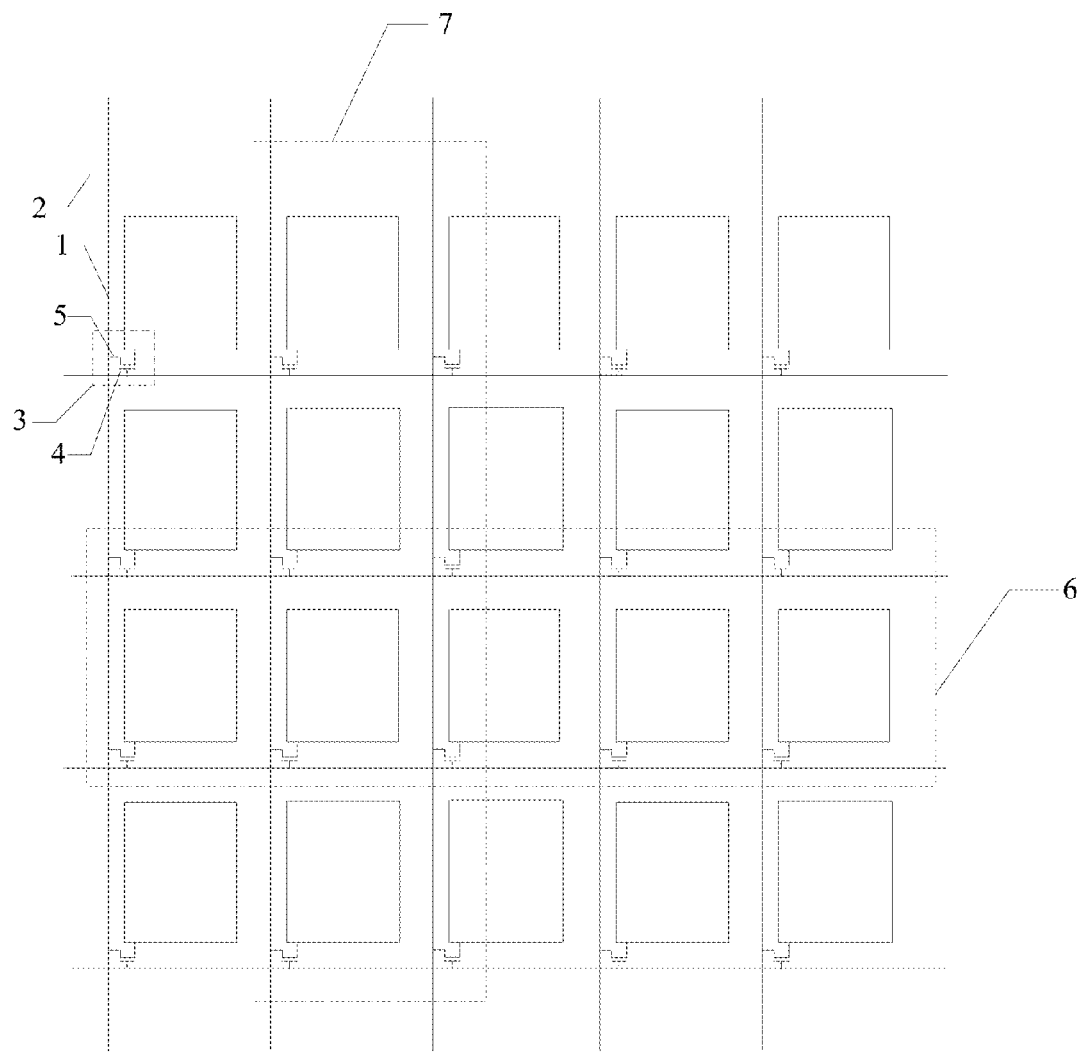
FIG. 1 is one of structural diagrams of the array substrate in a touch panel provided by an embodiment of the invention.

As shown in FIG. 1, a capacitive in-cell touch panel provided by an embodiment of the invention comprises an array substrate having data lines 1, gate lines 2 and thin film transistors 3; the gate 4 of the thin film transistor 3 is connected with one of the gate lines 2, and the source 5 of the transistor is connected with one of the data lines 1;

at least two neighboring gate lines 2 and the gates 4 connected with the gate lines 2 constitute a first touch sensing electrode 6;

at least two neighboring data lines 1 and the sources 5 connected with the data lines 1 constitute a second touch sensing electrode 7;

in a touch-control time period, a touch-control driving signal is loaded to the individual first touch sensing electrodes 6, the second touch sensing electrodes 7 are coupled with a voltage signal of the touch-control driving signal and then output; or, a touch-control driving signal is loaded to the individual second touch sensing electrodes 7, the first touch sensing electrodes 6 are coupled with a voltage signal of the touch-control driving signal and then output.

FIG. 1 is illustrated taking as an example that a first touch sensing electrode 6 is made up of two neighboring gate lines 2 and the gates 4 connected with the gate lines 2, and a second touch sensing electrode 7 is made up of two neighboring data lines 1 and the sources 5 connected with the data lines 1.

In the above touch panel provided by the embodiment of the invention, since at least two neighboring gate lines 2 on a common array substrate and the gates 4 connected with them serve as a first touch sensing electrode 6, at least two neighboring data lines 1 on the common array substrate and the sources 5 connected with them serve as a second touch sensing electrode 7, and there is no need to further add a new film layer on the existing array substrate, this may reduce the number of masking in the production process, decrease the thickness of the touch panel and lower the production cost; at the same time, multiple neighboring gate lines 2 and the gates 4 connected with them jointly serve as a first touch sensing electrode 6, multiple neighboring data lines 1 and the sources 5 connected with them jointly serve as a second touch sensing electrode 7, and this may increase the touch-control sensitivity of the touch panel.

Figure 2:
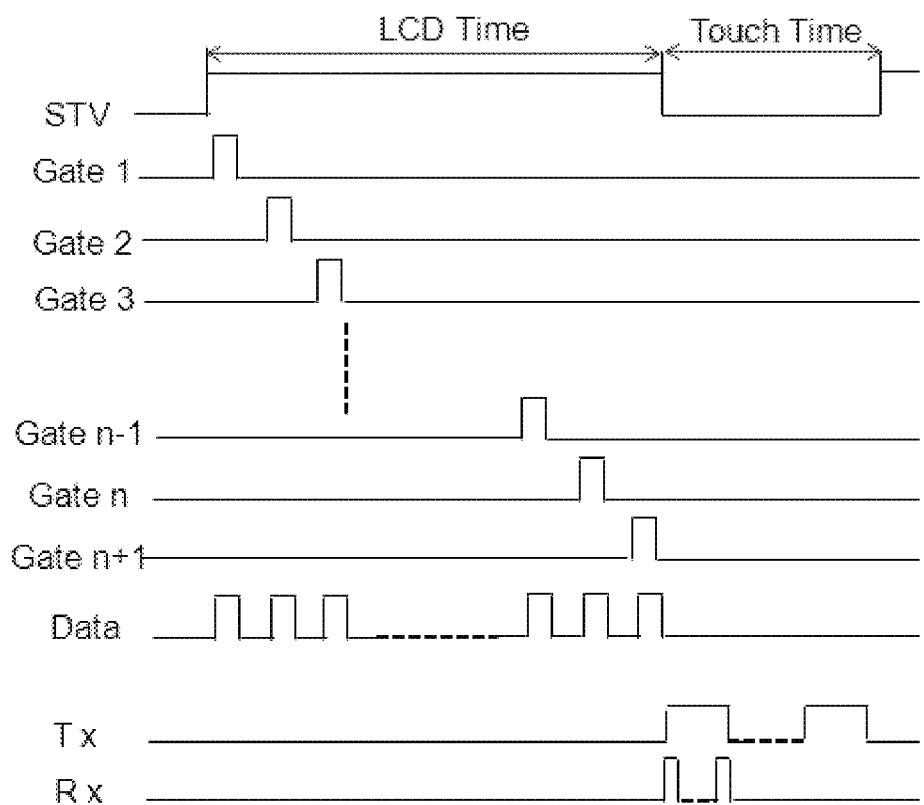
FIG. 2 is a time divisional driving timing chart of a touch panel provided by an embodiment of the invention.

What's more, in the above touch panel provided by the embodiment of the invention, a time divisional driving mode is adopted in a touch-control time period and a display time period, which may avoid the interference between the display signal and the touch-control driving signal, and guarantee the quality of a display picture and the accuracy of the touch-control. In particular, FIG. 2 is a time divisional driving timing chart of the above touch panel provided by an embodiment of the invention, wherein the time in which the touch panel displays each frame may be divided into a display time period (LCD Time) and a touch-control time period (Touch Time), and the STV signal is the start signal of a frame of image. As shown in FIG. 2, in the time period in which one frame is displayed, the length of the display time period and the touch-control time period may be allocated particularly according to the resolution of a different product, which will not be defined specifically herein. In the touch-control time period, a touch-control driving signal Tx is loaded to the individual first touch sensing electrodes 6, the second touch sensing electrodes 7 are coupled with the voltage signal Rx of the touch-control driving signal and output; or, a touch-control driving signal Tx is loaded to the individual second touch sensing electrodes 7, the first touch sensing electrodes 6 are coupled with the voltage signal Rx of the touch-control driving signal and output, and the touch-control function is achieved. In the display time period, a scanning signal is loaded successively to each gate line Gate 1, Gate 2, . . . , Gate n+1 in the touch panel, and a grayscale signal is loaded to the data lines Data, and the display function is achieved.

Figure 3A:
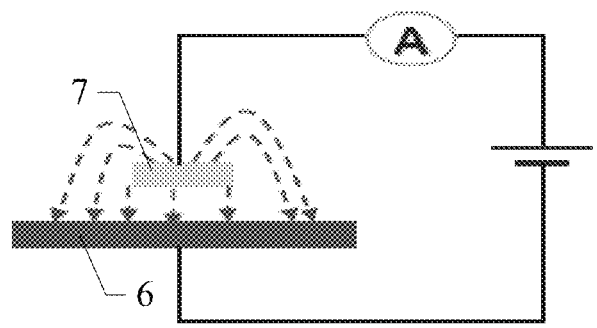
FIG. 3a is a schematic diagram when there is no touch on a touch panel provided by an embodiment of the invention.
Figure 3B:
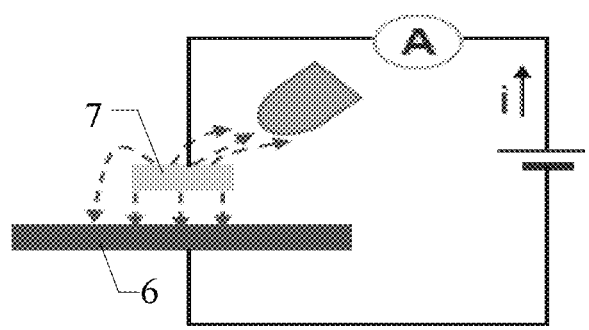
FIG. 3b is a schematic diagram when a touch panel provided by an embodiment of the invention is being touched.

As shown in FIG. 3a, the capacitor present between a first touch sensing electrode 6 and a second touch sensing electrode 7 is in a static balance state before the touch panel is touched by a finger; as shown in FIG. 3b, when the touch panel is touched by a finger, the finger creates a coupling capacitor with the first touch sensing electrode 6 and the second touch sensing electrode 7 respectively, such that the capacitor between the first touch sensing electrode 6 and the second touch sensing electrode 7 varies, and the contact position may be determined according to the variation of the voltage signal outputted by coupling, thereby realizing a multi-touch.

Preferably, in the capacitive in-cell touch panel provided by an embodiment of the invention, to guarantee the consistency of the touch-control sensitivity of the touch panel, the number of the gate lines 2 comprised in the individual first touch sensing electrodes 6 may be set to be the same; and the number of the data lines 1 comprised in the individual second touch sensing electrodes 7 may be set to be the same. Further, the number of the gate lines 2 comprised in the individual first touch sensing electrodes 6 may be set to be the same as the number of the data lines 1 comprised in the individual second touch sensing electrodes 7, or also the number of the gate lines 2 comprised in the individual first touch sensing electrodes 6 may be set to be different from the number of the data lines 1 comprised in the individual second touch sensing electrodes 7, which will not be defined herein and may be allocated reasonably particularly according to the actual touch-control sensitivity of the touch panel.

Figure 4:
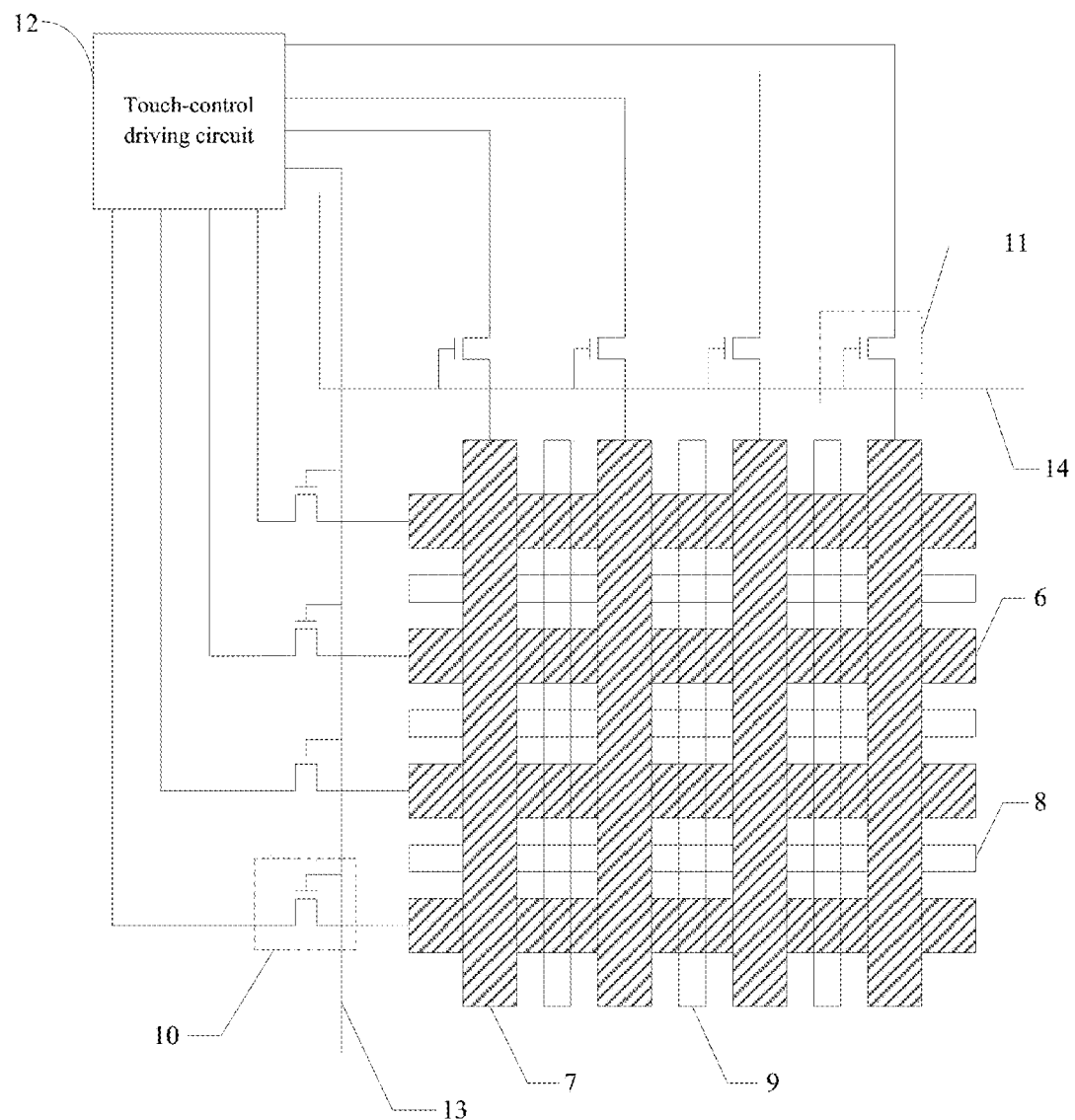
FIG. 4 is a second one of structural diagrams of the array substrate in a touch panel provided by an embodiment of the invention.

To avoid producing a signal interference between the individual first touch sensing electrodes 6, as shown in FIG. 4, a first floating electrode 8 may be disposed between individual first touch sensing electrodes 6, which first floating electrode 8 is made up of at least one gate line adjacent to respective first touch sensing electrodes 6 and the gates (not shown) connected with the at least one gate line; and/or, to avoid producing a signal interference between the individual second touch sensing electrodes 7, a second floating electrode 9 may be disposed between individual second touch sensing electrodes 7, which second floating electrode 9 is made up of at least one data line adjacent to respective second touch sensing electrodes 7 and the sources (not shown) connected with the at least one data line. In the touch-control time period, both the first floating electrode 8 and the second floating electrode 9 may be grounded; and in the display time period, a display driving circuit inputs a scanning signal and a grayscale signal to the first floating electrode 8 and the second floating electrode 9, respectively.

Preferably, in the capacitive in-cell touch panel provided by an embodiment of the invention, to guarantee the consistency of the touch-control precision of the touch panel, the number of the gate lines 2 comprised in the individual first floating electrodes 8 may be set to be the same, namely, the spacing between the individual first touch sensing electrodes 6 is the same; and the number of the data lines 1 comprised in the individual second floating electrodes 9 may be set to be the same, namely, the spacing between the individual second touch sensing electrodes 7 is the same. Further, the number of the gate lines 2 comprised in the individual first floating electrodes 8 may be set to be the same as the number of the data lines 1 comprised in the individual second floating electrodes 9, and/or the spacing between the individual first touch sensing electrodes 6 may be made to be identical to the spacing between the individual second touch sensing electrodes 7; also the number of the gate lines 2 comprised in the individual first floating electrodes 8 may be set to be different from the number of the data lines 1 comprised in the individual second floating electrodes 9, namely, the spacing between the individual first touch sensing electrodes 6 is different from the spacing between the individual second touch sensing electrodes 7, which will not be defined herein and may be allocated reasonably particularly according to the actual touch-control precision of the touch panel.

As shown in FIG. 4, the above touch panel provided by an embodiment of the invention may further comprise: first touch-control switches 10 in one-to-one correspondence with the first touch sensing electrodes 6, second touch-control switches 11 in one-to-one correspondence with the second touch sensing electrodes 7, and a touch-control driving circuit 12; the first touch sensing electrodes 6 are electrically connected with the touch-control driving circuit 12 via respective first touch-control switches 10, and the second touch sensing electrodes 7 are electrically connected with the touch-control driving circuit 12 via respective second touch-control switches 11.

In a specific implementation, the first touch-control switches 10 and the second touch-control switches 11 may be realized employing a thin film transistor (TFT). In particular, as shown in FIG. 4, a peripheral lead 13 and a peripheral lead 14 may be added in a non-display area, the gates of the individual thin film transistors as the first touch-control switches 10 are connected with the peripheral lead 13, their sources are connected with the touch-control driving circuit 12, and their drains are connected with respective first touch sensing electrodes 6; the gates of the individual thin film transistors as the second touch-control switches 11 are connected with the peripheral lead 14, their sources are connected with the touch-control driving circuit 12, and their drains are connected with respective second touch sensing electrodes 7. In the touch-control time period, the touch-control driving circuit 12 provides the first touch-control switches 10 and the second touch-control switches 11 with a control signal via the peripheral lead 13 and the peripheral lead 14, respectively, so as to cause the first touch-control switches 10 and the second touch-control switches 11 to be in an ON state, such that the touch-control driving circuit 12 is in a conducting state with the first touch sensing electrodes 6 and the second touch sensing electrodes 7, respectively. In the display time period, the control signal is turned off which is loaded to the first touch-control switches 10 and the second touch-control switches 11 by the touch-control driving circuit 12 via the peripheral lead 13 and the peripheral lead 14, such that the first touch-control switches 10 and the second touch-control switches 11 are in an OFF state, and the connections of the touch-control driving circuit 12 with the first touch sensing electrodes 6 and the second touch sensing electrodes 7 are switched off. By controlling the switching states of the first touch-control switches 10 and the second touch-control switches 11 by the touch-control driving circuit 12, it is assured that there is no interference between the display signal and the touch-control driving signal.

In particular, the first touch-control switches 10 and the second touch-control switches 11 may be disposed inside the touch-control driving circuit 12, or, as shown in FIG. 4, the first touch-control switches 10 may be disposed where the first touch sensing electrodes 6 are connected with the touch-control driving circuit 12, and the second touch-control switches 11 may be disposed where the second touch sensing electrodes 7 are connected with the touch-control driving circuit 12, which will not be defined herein.

Preferably, the touch-control driving circuit 12 may be disposed inside the display driving circuit of the touch panel, namely, the touch-control driving circuit 12 and the display driving circuit may be integrated as a whole, and this may further lower the production cost.

Based on one and the same inventive concept, an embodiment of the invention further provides a display device comprising the above capacitive in-cell touch panel provided by an embodiment of the invention, which display device may be any product or component having a display function, such as a mobile phone, a tablet computer, a television, a display, a notebook computer, a digital photo frame, a navigator, etc. The implementation of the display device may refer to the embodiments of the above capacitive in-cell touch panel, and the duplications will not be repeated herein.

In a capacitive in-cell touch panel and a display device provided by the embodiments of the invention, since at least two neighboring gate lines on a common array substrate and the gates connected with them serve as a first touch sensing electrode, at least two neighboring data lines on the common array substrate and the sources connected with them serve as a second touch sensing electrode, and there is no need to further add a new film layer on the existing array substrate, this may reduce the number of masking in the production process, decrease the thickness of the touch panel and lower the production cost; at the same time, multiple neighboring gate lines and the gates connected with them jointly serve as a first touch sensing electrode, multiple neighboring data lines and the sources connected with them jointly serve as a second touch sensing electrode, and this may increase the touch-control sensitivity of the touch panel; and moreover, a time divisional driving mode is adopted in the touch-control time period and the display time period, which may avoid the interference between the display signal and the touch-control driving signal, and guarantee the quality of a display picture and the accuracy of the touch-control.

Clearly, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

The invention claimed is:

1. A capacitive in-cell touch panel comprising an array substrate having data lines, gate lines and thin film transistors; a gate of the thin film transistor being connected with one of the gate lines, and a source of the transistor being connected with one of the data lines; wherein:
    at least two neighboring gate lines and the gates connected with the gate lines constitute a first touch sensing electrode;
    at least two neighboring data lines and the sources connected with the data lines constitute a second touch sensing electrode;
    in a touch-control time period, a touch-control driving signal is loaded to the individual first touch sensing electrodes, the second touch sensing electrodes are coupled with a voltage signal of the touch-control driving signal and then output; or, a touch-control driving signal is loaded to the individual second touch sensing electrodes, the first touch sensing electrodes are coupled with a voltage signal of the touch-control driving signal and then output.

2. The touch panel as claimed in claim 1, wherein the number of the gate lines comprised in the individual first touch sensing electrodes is identical; and the number of the data lines comprised in the individual second touch sensing electrodes is identical.

3. The touch panel as claimed in claim 2, wherein the number of the gate lines comprised in the individual first touch sensing electrodes is the same as the number of the data lines comprised in the individual second touch sensing electrodes.

4. The touch panel as claimed in claim 1, wherein at least one gate line between the individual first touch sensing electrodes and the gates connected with the at least one gate line constitute a first floating electrode; and/or,
    at least one data line between the individual second touch sensing electrodes and the sources connected with the at least one data line constitute a second floating electrode.

5. The touch panel as claimed in claim 4, wherein the number of the gate lines comprised in the individual first floating electrodes is identical; and the number of the data lines comprised in the individual second floating electrodes is identical.

6. The touch panel as claimed in claim 5, wherein the number of the gate lines comprised in the individual first floating electrodes is the same as the number of the data lines comprised in the individual second floating electrodes.

7. The touch panel as claimed in claim 1, further comprising: first touch-control switches in one-to-one correspondence with the first touch sensing electrodes, second touch-control switches in one-to-one correspondence with the second touch sensing electrodes, and a touch-control driving circuit; wherein
    the first touch sensing electrodes are electrically connected with the touch-control driving circuit via respective first touch-control switches, and the second touch sensing electrodes are electrically connected with the touch-control driving circuit via respective second touch-control switches; and
    in the touch-control time period, the touch-control driving circuit controls the first touch-control switches and the second touch-control switches to be in an ON state, respectively, such that the touch-control driving circuit is in a conducting state with the first touch sensing electrodes and the second touch sensing electrodes, respectively.

8. The touch panel as claimed in claim 7, wherein the first touch-control switches and the second touch-control switches are located inside the touch-control driving circuit; or,
    the first touch-control switches are located where the first touch sensing electrodes are connected with the touch-control driving circuit, and the second touch-control switches are located where the second touch sensing electrodes are connected with the touch-control driving circuit.

9. The touch panel as claimed in claim 7, wherein the touch-control driving circuit is located inside a display driving circuit in the touch panel.

10. A display device comprising a capacitive in-cell touch panel;
    the capacitive in-cell touch panel comprising an array substrate having data lines, gate lines and thin film transistors; a gate of the thin film transistor being connected with one of the gate lines, and a source of the transistor being connected with one of the data lines, wherein:

at least two neighboring gate lines and the gates connected with the gate lines constitute a first touch sensing electrode;

at least two neighboring data lines and the sources connected with the data lines constitute a second touch sensing electrode;

in a touch-control time period, a touch-control driving signal is loaded to the individual first touch sensing electrodes, the second touch sensing electrodes are coupled with a voltage signal of the touch-control driving signal and then output; or, a touch-control driving signal is loaded to the individual second touch sensing electrodes, the first touch sensing electrodes are coupled with a voltage signal of the touch-control driving signal and then output.

\* \* \* \* \*